Feb. 23, 1954   F. R. SMITH ET AL   2,670,199
SPACING DEVICE FOR FRICTIONALLY OPPOSED BODIES
Filed Dec. 13, 1950
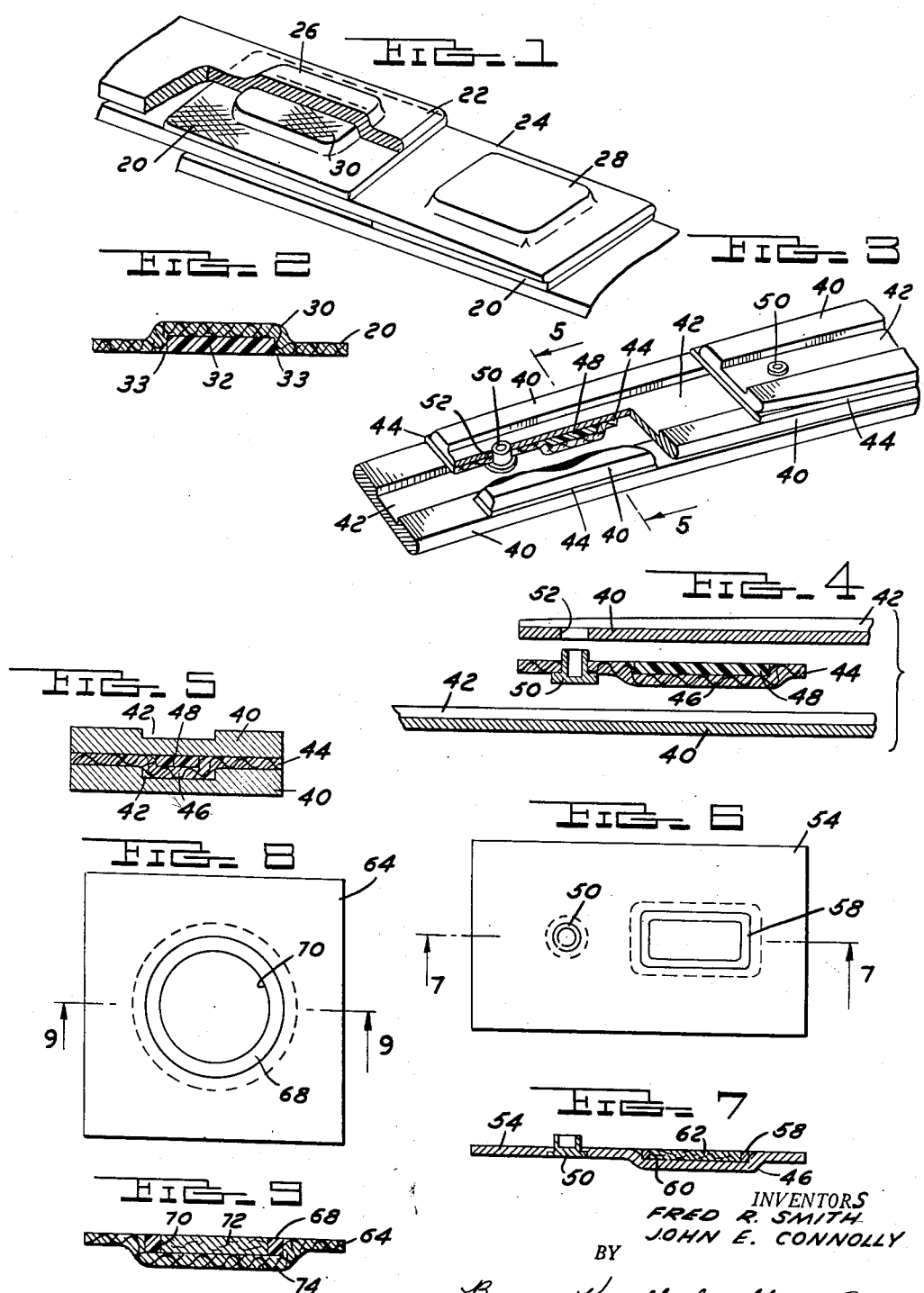
INVENTORS
FRED R. SMITH
JOHN E. CONNOLLY
BY
Barnes, Kisselle, Laughlin & Raisch
ATTORNEYS Patented Feb. 23, 1954

2,670,199

UNITED STATES PATENT OFFICE 2,670,199

SPACING DEVICE FOR FRICTIONALLY OPPOSED BODIES

Fred R. Smith and John E. Connolly, Detroit, Mich., assignors to Neveroil Products Company, Hamburg, Mich., a corporation of Michigan Application December 13, 1950, Serial No. 200,678

10 Claims. (Cl. 267—49)

This invention relates to a spacing device for frictionally opposed bodies.

It is an object of the invention to provide a relatively flat insert to be interposed between relatively movable bodies such as the leaves of a leaf spring assembly. Lubricant impregnated fabric inserts have been used with a considerable degree of success. However, under extremely heavy loads they are subject to crushing and loss of resiliency.

An object of the invention is, therefore, to utilize the resiliency and the lubricating qualities of the fabric insert and to combine with the fabric insert a bearing material of hard plastic called "nylon." Commercial nylon has been found to possess unusual resistance to compression and abrasion. It cannot successfully be substituted for the fabric because it develops noise in frictional movement after a certain length of time in operation.

The present invention contemplates a combination of a fabric frame and nylon center, with or without a center reservoir for lubricant, the fabric being impregnated with a lubricant. The fabric provides a sealing surface around the nylon insert. Extensive tests have shown that the fabric insert life is greatly prolonged, and there is no friction noise developed in the nylon bearing surface.

Other objects and features of the invention relate to details of the construction of the combined insert and the co-operation with the spring assembly.

Drawings accompany the specification, and the various views thereof may be briefly described as:

Figure 1, a cut-away section of a perspective view of a spring assembly showing the manner in which the spring insert may be located.

Figure 2, a sectional view of the insert.

Figure 3, a modified embodiment of the invention used in a grooved spring section commonly in use today.

Figure 4, a view showing the manner of assembly of this modification of Figure 3.

Figure 5, a sectional view on line 5—5 of Figure 3.

Figure 6, a modified disclosure showing a nylon insert with a center recess adapted for use in a grooved spring section.

Figure 7, a sectional view on line 7—7 of Figure 6.

Figure 8, a modified construction showing a circular nylon insert with center recess.

Figure 9, a sectional view on line 9—9 of Figure 8.

Referring to Figure 1, the fabric spring insert is shown at 20 between leaf springs 22 and 24. The leaf springs are provided with pockets 26 and 28 formed into the leaf springs to receive a boss portion 30 extending upwardly from the surface of the fabric 20 centrally thereof. This boss portion is formed by pressing lubricant-impregnated fabric over a nylon insert 32, the insert having a slightly greater thickness than the final compressed thickness of the fabric and thus extending up into the boss portion 30.

The fabric is preferably cotton duck or especially woven cotton fabric and is impregnated with a suitable lubricant having properties to hold the pad to its pressed shape. One example of such a lubricant is composed of:

Stearic acid
Calcium oxide
Carnauba wax
Stanoil No. 25

The Stanoil No. 25 is a mineral oil produced by the Standard Oil Company. Other compositions may be used, but this one is found to have a fairly hard consistency at normal temperatures and yet has sufficient lubricating effect to accomplish the purposes desired. The cotton duck is impregnated with a hot mixture of the above ingredients and preferably pressed around the nylon insert while warm. Upon solidification, the parts will remain together and in the shape shown.

The nylon used is commonly referred to as "commercial" nylon and is provided in the form of a flat disk or rectangle. It is referred to by the manufacturing company, Du Pont, as nylon No. FM 10001. This nylon has a resistance to compression which is comparable to that of steel and a remarkable resistance to bearing wear.

In operation it will be seen that the surface of the nylon exposed is flush with the surface of the fabric 20, and pressure between the spring leaves will be applied evenly around the fabric insert and on the nylon insert. In addition, the embossed portion will provide a positioning device in co-operation with the pockets of the spring since the fabric is completely impregnated and will be a sealing surface around the nylon which keeps out dust and dirt and which, due to the reciprocal action of the members, will feed a certain amount of lubricating material to the nylon surface as the parts operate in the spring. These two functions of the lubricant-impregnated fabric serve to insure quiet action throughout the life of the unit.

In Figures 3 to 5 a modified device has been disclosed for use particularly in the so-called "grooved spring section." Here, each spring section 40 is provided with a groove 42. The fabric insert 44 is slightly elongated as compared with the disclosure of Figure 1; and at one end an embossed portion 46 having a transverse section to be received by the grooves 42 is provided by pressing a nylon insert 48 into place, the insert being elongated and of similar dimensions to establish the proper relation with the groove 42. Aligned with, but spaced from, the embossed portion 46, a rivet or other similar type of locator 50 cooperates with a hole 52 in the spring section to secure the insert against longitudinal displacement.

The fabric of Figures 3 to 5 is also impregnated as above described; and the nylon is of the same material, the operation being substantially the same as described with respect to Figure 1.

In Figure 6 an insert 54 is shown somewhat similar to that shown in Figures 3 to 5 except that the nylon insert is composed of a rectangular frame-like member 58, having formed centrally thereof an aperture which proves to be a reservoir 60 for the same type of lubricant as is used to impregnate the fabric. This lubricant is form-retaining at room temperature and will fill the pocket 60, thus providing an additional source 62 of lubrication for the nylon surfaces of the insert.

In Figure 8 a square insert 64 has been shown with a ring-like insert 68 which also has a central pocket 70 to receive lubricant 72. The unit of Figures 8 and 9 also has an embossed portion 74 created by pressing the ring-like nylon insert into the fabric which serves as a locating projection for the assembly.

In each case where the relatively hard nylon insert is pressed into the impregnated fabric there is a drawing action and the fabric will not always fit snugly at the outside surface edges of the insert. In the pressing action, however, there is considerable compression of the fabric and the lubricant will tend to flow into all crevices available. Thus, as shown in Figure 2 at 33, there will be a pocket of lubricant around the edge of the nylon insert. Since this lubricant is quite hard at room temperatures, it will be firmly in position and will furnish a source of lubricant for the insert in addition to that in the fabric itself.

We claim:

1. In combination, two relatively movable, frictionally opposed members, one of which has a depression therein facing the other, a pad-like, impregnated textile fabric spacing device between said members provided with a flat body portion with opposed, flat operating sides and an integral, preformed boss portion on one of said sides bottomed in said depression for anchoring said device with relation to one of said members, and means to reinforce said boss portion and to serve as a load-sharing and wear member within the confines of said device comprising a flat solid insert of nylon plastic extending into said boss portion having only one flat surface exposed, said surface being substantially flush with the surface of the body portion lying on the plane of said exposed surface, the other flat surface of the insert being bottomed in said boss portion, said body portion being impregnated with a relatively hard lubricating substance adapted to be worked to the exposed surface of the load-bearing member by relative motion between the opposed members.

2. A friction control unit as defined in claim 1 in which the insert is pressed into said body completely within the borders thereof and the margins of the body on each side of the insert are impregnated with a lubricant which can work by motion of the opposed members to the exposed surface of the insert.

3. A friction control unit as defined in claim 1 in which the insert is provided with an opening on its exposed surface to serve as a reservoir, and a body of substantially solid lubricant in said opening adapted to work by friction to the surfaces of the insert.

4. A friction control unit as defined in claim 1 in which edges of the nylon insert are spaced adjacent the outer surface from the fabric body, these spaces being filled with solid lubricant.

5. In combination, two frictionally opposed, relatively movable members, and means for controlling the friction therebetween comprising a fabric body as a load-bearing member, an opening in at least one surface of said body, and a load-sharing and wear member comprising an insert in said opening having an exposed outer surface flush with the surface of the body to contact one of said opposed members, said insert being backed on a side opposed to said exposed surface respectively by an offset portion of the load-bearing member and by the other of said opposed members, said insert being composed of a plastic such as nylon, and a lubricating substance impregnating said fabric and adapted to be worked to the surface of said insert by relative motion of the opposed members.

6. A friction control member as defined in claim 5 in which the wear insert also has a surface opening, lubricating means having substantially solid characteristics at room temperature impregnating the fabric body and filling the opening in the wear insert, which fabric and insert opening serve as a reservoir for lubricant which can work to the surface of the insert to lubricate the said surface.

7. A friction control member as defined in claim 5 in which the wear insert is perforated to provide an inner reservoir, and a relatively solid lubricant filling said chamber and which can work to the surface of said wear insert to lubricate the same.

8. For positionment between two frictionally opposed members for controlling the friction therebetween, a load-bearing member comprising a fabric body impregnated with a lubricant, an opening in at least one surface of said body, and a load-sharing and wear member in said opening having an exposed surface flush with one surface of the body, the side of said insert opposite said exposed surface being backed by said load-bearing member in a manner to transmit load from said load-bearing member to said insert, said wear member being composed of a plastic such as nylon having a thickness greater than the thickness of the fabric to facilitate the location of said body.

9. A control pad for positionment between two frictionally opposed members such as spring leaves for controlling the friction therebetween comprising a woven fabric bearing piece shaped to position between said members and having opposed operating surfaces, an opening formed in at least one of said surfaces, and a load-sharing and wear member in said opening projecting into said bearing piece having one operating surface substantially flush with an operating surface of said bearing piece, said wear member being composed of a plastic such as nylon and being positioned to receive compressive force from the opposed members on both sides of said fabric bearing piece, said fabric bearing piece being impregnated with a lubricant.

10. A device as defined in claim 9 in which the wear member has a thickness greater than the fabric bearing piece and projects into an offset protruding portion of the bearing piece.

FRED R. SMITH.
JOHN E. CONNOLLY.

References Cited in the file of this patent

UNITED STATES PATENTS

| Number | Name | Date |
|---|---|---|
| 2,221,488 | Paton | Nov. 12, 1940 |
| 2,246,086 | Austin | June 17, 1941 |
| 2,319,172 | Watson et al. | May 11, 1943 |